(12) United States Patent
Caliskan

(10) Patent No.: US 11,628,714 B2
(45) Date of Patent: Apr. 18, 2023

(54) TRACTION BATTERY PACK SUPPORT SYSTEM

(71) Applicant: Ford Global Technologies, LLC, Dearborn, MI (US)

(72) Inventor: Ari Garo Caliskan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 16/950,106

(22) Filed: Nov. 17, 2020

(65) Prior Publication Data

US 2022/0153110 A1 May 19, 2022

(51) Int. Cl.
*B60K 1/04* (2019.01)

(52) U.S. Cl.
CPC ........ *B60K 1/04* (2013.01); *B60K 2001/0438* (2013.01)

(58) Field of Classification Search
CPC .............. B60K 1/04; B60K 2001/0438; B60K 2001/0422; B60K 2001/0427; B60K 2001/0433
See application file for complete search history.

(56) References Cited

U.S. PATENT DOCUMENTS

| | | | | |
|---|---|---|---|---|
| 9,764,629 B2* | 9/2017 | Schmalzrieth | ........... | B60K 1/04 |
| 9,884,545 B1* | 2/2018 | Addanki | ................. | F16F 15/04 |
| 10,752,072 B2* | 8/2020 | Samyn | ...................... | F16F 9/54 |
| 10,913,340 B2* | 2/2021 | Tsuyuzaki | ................ | B60K 1/04 |
| 2013/0192914 A1* | 8/2013 | Nakamori | ............. | H01M 50/20 180/68.5 |
| 2015/0239331 A1* | 8/2015 | Rawlinson | ........... | B62D 21/157 180/68.5 |
| 2019/0081298 A1* | 3/2019 | Matecki | ................ | B60R 19/023 |
| 2019/0315217 A1* | 10/2019 | Hohm | ................. | H01M 50/216 |
| 2020/0023724 A1* | 1/2020 | Nuruki | ..................... | B60K 1/04 |
| 2020/0070610 A1* | 3/2020 | Samyn | ..................... | B60K 1/04 |
| 2020/0070639 A1* | 3/2020 | Bohmer | .................... | B60K 1/04 |
| 2020/0231222 A1* | 7/2020 | Ahn | ....................... | B60N 2/012 |
| 2020/0269933 A1* | 8/2020 | Ryu | ..................... | B62D 25/025 |
| 2020/0324827 A1* | 10/2020 | Ahn | ......................... | B60K 1/04 |
| 2020/0331334 A1* | 10/2020 | Sloan | ..................... | B60L 50/64 |
| 2020/0406982 A1* | 12/2020 | Chung | ................ | B62D 25/025 |
| 2021/0039716 A1* | 2/2021 | Sasaoka | ................ | B62D 24/02 |
| 2021/0122422 A1* | 4/2021 | Kimura | ................ | B62D 25/08 |
| 2021/0188069 A1* | 6/2021 | Friedman | ............. | H01M 50/20 |
| 2021/0214012 A1* | 7/2021 | Takahashi | ............. | B62D 27/02 |
| 2021/0221436 A1* | 7/2021 | Tsuyuzaki | ............ | B62D 25/025 |
| 2021/0221442 A1* | 7/2021 | Takahashi | ............ | B62D 27/023 |
| 2021/0371011 A1* | 12/2021 | Itoh | ..................... | H01M 50/242 |
| 2022/0059894 A1* | 2/2022 | Stephens | ............. | H01M 50/209 |

(Continued)

FOREIGN PATENT DOCUMENTS

| | | |
|---|---|---|
| JP | 2020090208 | 6/2020 |
| KR | 20190112474 | 10/2019 |

*Primary Examiner* — Katy M Ebner
(74) *Attorney, Agent, or Firm* — David B. Kelley; Carlson, Gaskey & Olds, P.C.

(57) ABSTRACT

A traction battery pack support system includes, among other things, a vehicle frame rail of an electrified vehicle, a traction battery pack, a vibration isolator that is disposed outside an interior of the vehicle frame rail and is at least partially vertically aligned with the vehicle frame rail, and at least one fastener that couples the traction battery pack to the vehicle frame rail through the vibration isolator.

16 Claims, 4 Drawing Sheets

(56) References Cited

U.S. PATENT DOCUMENTS

2022/0063389 A1\* 3/2022 Suewaka ............. H01M 6/5038
2022/0089039 A1\* 3/2022 Sassi ....................... B62D 21/15
2022/0111910 A1\* 4/2022 Hirota ...................... B60K 1/04
2022/0118842 A1\* 4/2022 Inoue ....................... B60K 1/04
2022/0126664 A1\* 4/2022 Caliskan .................. B60K 1/04

\* cited by examiner

TRACTION BATTERY PACK SUPPORT SYSTEM

TECHNICAL FIELD

This disclosure relates generally to supporting a traction battery pack of an electrified vehicle.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. Example electrified vehicles include hybrid electric vehicles (HEVs), plug-in hybrid electric vehicles (PHEVs), and battery electric vehicles (BEVs).

SUMMARY

A traction battery pack support system according to an exemplary aspect of the present disclosure includes, among other things, a vehicle frame rail of an electrified vehicle, a traction battery pack, a vibration isolator that is disposed outside an interior of the vehicle frame rail and is at least partially vertically aligned with the vehicle frame rail, and at least one fastener that couples the traction battery pack to the vehicle frame rail through the vibration isolator.

Another example of the foregoing traction battery pack support system includes a bracket secured to the vehicle frame rail and a flange of the traction battery pack. The flange extends laterally outward from the traction battery pack to laterally overlap with the bracket. The vibration isolator is disposed vertically between a portion of the flange and a portion of the bracket. The fastener connects the flange to the bracket to couple the traction battery pack to the vehicle frame rail.

In another example of any of the foregoing traction battery pack support systems, the fastener extends through an aperture in the isolator.

In another example of any of the foregoing traction battery pack support systems, the isolator is compressed vertically between the flange and the bracket when the fastener is connecting the flange to the bracket.

In another example of any of the foregoing traction battery pack support systems, the fastener is a threaded fastener that extends through an aperture in the flange and an aperture in the bracket.

In another example of any of the foregoing traction battery pack support systems, at least a portion of the isolator is vertically aligned with the vehicle frame rail and the traction battery pack.

In another example of any of the foregoing traction battery pack support systems, the flange extends vertically beneath the isolator and vertically beneath the bracket.

Another example of any of the foregoing traction battery pack support systems includes a nut within an interior of the bracket. The fastener is threadably engaged with the nut to couple the traction battery pack to the vehicle frame rail.

In another example of any of the foregoing traction battery pack support systems, the vibration isolator is disposed laterally between a horizontally facing sidewall of the traction battery pack and the vehicle frame rail.

In another example of any of the foregoing traction battery pack support systems, the bracket is welded to an inboard side of the vehicle frame rail. The inboard side faces inward toward a centerline of the electrified vehicle.

Another example of any of the foregoing traction battery pack support systems includes a bracket having an aperture that holds the vibration isolator. The fastener is a first fastener that connects the bracket to the traction battery pack through the vibration isolator. A second fastener connects the bracket directly to the vehicle frame rail.

In another example of any of the foregoing traction battery pack support systems, the bracket includes a vertically extending portion and a horizontally extending portion. The vertically extending portion including the aperture that holds the vibration isolator. The horizontally extending portion extends beneath the vehicle frame rail.

In another example of any of the foregoing traction battery pack support systems, the second fastener extends through an aperture in the horizontally extending portion when connecting the bracket directly to the vehicle frame rail.

Another example of any of the foregoing traction battery pack support systems includes a bracket. The fastener is a first fastener that connects the bracket to the traction battery pack through the vibration isolator. A second fastener connects the bracket directly to the vehicle frame rail. The vibration isolator is held within an aperture of the traction battery pack.

In another example of any of the foregoing traction battery pack support systems, the bracket includes a vertically extending portion and a horizontally extending portion. The first fastener extends through an aperture in the vertically extending portion. The second fastener extends through an aperture in the horizontally extending portion.

In another example of any of the foregoing traction battery pack support systems, the horizontally extending portion extending beneath the vehicle frame rail.

A traction battery pack support system according to another exemplary aspect of the present disclosure includes, among other things, a vehicle frame rail assembly including a first frame rail portion and a second frame rail portion that is secured directly to the first frame rail portion. The system further includes a traction battery pack, a vibration isolator, and at least one fastener that couples the traction battery pack to the first frame rail portion through the vibration isolator and the second frame rail portion.

In another example of the foregoing system, the second frame rail portion is a lower frame rail portion and the first frame rail portion is an upper frame rail portion. The lower frame rail portion at least partially received within the upper frame rail portion. The vibration isolator is at least partially disposed within an interior of the lower frame rail portion.

In another example of the foregoing method, the fastener extends through the vibration isolator and the interior of the lower frame rail portion to threadably engage a nut.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary system that supports a traction battery of an electrified vehicle and, more particularly, to a system that secures the traction battery to a vehicle frame rail through the vibration isolator. The traction battery is secured while using relatively little vertical packaging space. The system is particularly useful for supporting traction batteries of electrified vehicles that have to meet a relatively high ground clearance requirement, such as pickup trucks.

Figure 1:
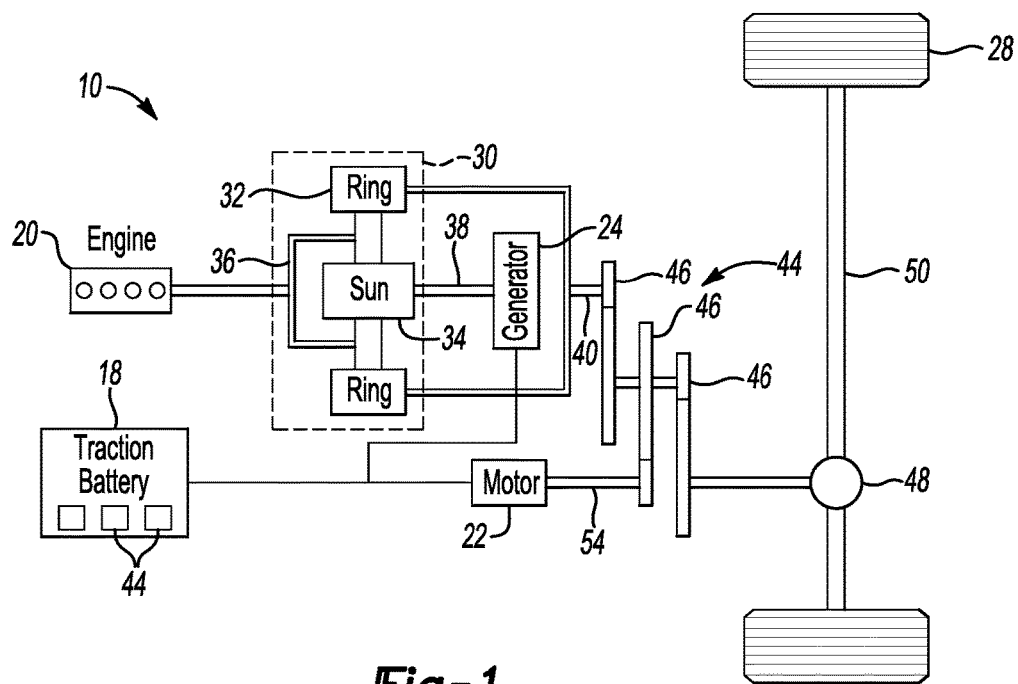
FIG. 1 illustrates a schematic view of a powertrain for an electrified vehicle.

FIG. 1 schematically illustrates selected portions of a powertrain 10 of an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In an embodiment, the powertrain 10 is a powersplit powertrain system that employs a first drive system and a second drive system. The first drive system includes a combination of an engine 12 and a generator 14 (i.e., a first electric machine). The second drive system includes at least a motor 16 (i.e., a second electric machine), the generator 14, and at least one traction battery pack 18. In this example, the second drive system is considered an electric drive system of the powertrain 10. The first and second drive systems generate torque to drive one or more sets of vehicle drive wheels 20 of the electrified vehicle.

The engine 12, which is an internal combustion engine in this example, and the generator 14 may be connected through a power transfer unit 22. In one non-limiting embodiment, the power transfer unit 22 is a planetary gear set that includes a ring gear 24, a sun gear 26, and a carrier assembly 28. Of course, other types of power transfer units, including other gear sets and transmissions, may be used to connect the engine 12 to the generator 14.

The generator 14 can be driven by engine 12 through the power transfer unit 22 to convert kinetic energy to electrical energy. The generator 14 can alternatively function as a motor to convert electrical energy into kinetic energy, thereby outputting torque to a shaft 30 connected to the power transfer unit 22. Because the generator 14 is operatively connected to the engine 12, the speed of the engine 12 can be controlled by the generator 14.

The ring gear 24 of the power transfer unit 22 may be connected to a shaft 32, which is connected to vehicle drive wheels 20 through a second power transfer unit 34. The second power transfer unit 34 may include a gear set having a plurality of gears 36. Other power transfer units may also be suitable. The gears 36 transfer torque from the engine 12 to a differential 38 to ultimately provide traction to the vehicle drive wheels 20. The differential 38 may include a plurality of gears that enable the transfer of torque to the vehicle drive wheels 20. In this example, the second power transfer unit 34 is mechanically coupled to an axle 40 through the differential 38 to distribute torque to the vehicle drive wheels 20.

The motor 16 (i.e., the second electric machine) can also be employed to drive the vehicle drive wheels 20 by outputting torque to a shaft 42 that is also connected to the second power transfer unit 34. In one embodiment, the motor 16 and the generator 14 cooperate as part of a regenerative braking system in which both the motor 16 and the generator 14 can be employed as motors to output torque. For example, the motor 16 and the generator 14 can each output electrical power to the traction battery pack 18.

The traction battery pack 18 has the form of a high-voltage battery that is capable of outputting electrical power to operate the motor 16 and the generator 14. The traction battery pack 18 is a traction battery as it provides power to drive the vehicle drive wheels 20.

In the exemplary embodiment, the traction battery pack 18 is a battery pack that includes a plurality of battery arrays 44 or battery modules. Each of the battery arrays 44 includes a plurality of individual battery cells.

Figure 2:
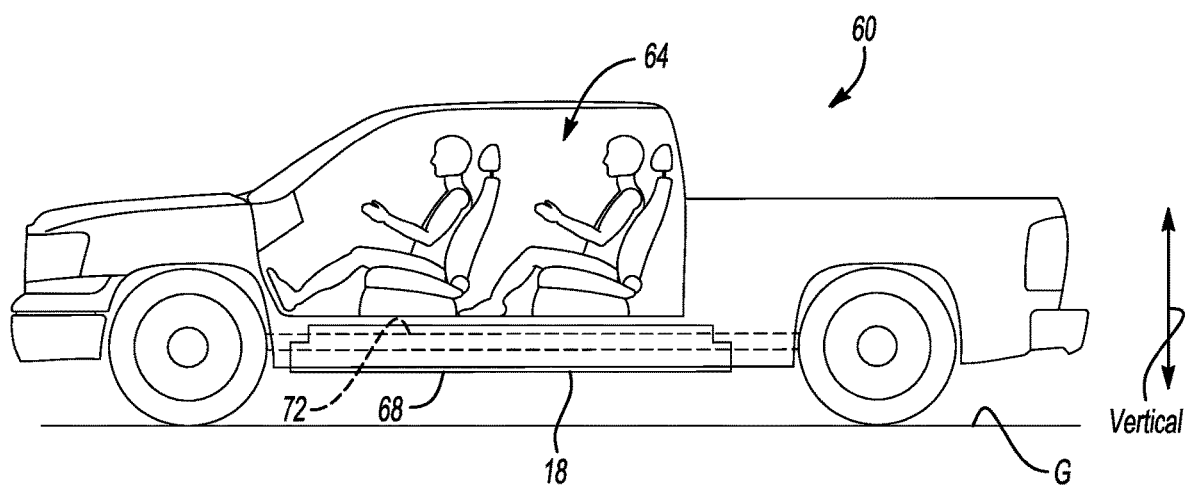
FIG. 2 illustrates a schematic side view of an electrified vehicle incorporating the powertrain of FIG. 1.

Referring now to FIG. 2 with continuing reference to FIG. 1, an electrified vehicle 60 can include the powertrain 10 of FIG. 1. The electrified vehicle 60 includes the traction battery pack 18 at a position vertically beneath a passenger compartment 64 of the vehicle 60. Vertical, for purposes of this disclosure, is with reference to ground G in the general orientation of the vehicle 60 during ordinary operation.

Pickup trucks, such as the electrified vehicle 60, can require a battery pack that is larger and heavier than a traditional pickup truck fuel tank. The battery pack 18, which is used in connection with the pickup truck, may be larger and higher than a battery pack utilized with a smaller electrified vehicle, such as a sedan.

Ground clearance requirements may dictate that areas of the vehicle maintain a certain distance or clearance to the ground G. In the past, traction battery packs have been supported utilizing supports extending beneath the traction battery pack below a bottom surface 68 of the traction battery pack 18. If supports extend beneath the traction battery pack 18, the ground clearance requirements could force the traction battery pack 18 to be packaged at a vertically higher position, which could limit a size of the passenger compartment 64.

Exemplary support systems of this disclosure support a traction battery pack, such as the traction battery pack 18, in a vertical area that is smaller than the support systems extending beneath the traction battery pack 18. In the exemplary embodiments of this disclosure, vehicle frame rails are used as part of the support system for the traction battery pack 18. FIG. 2 shows a broken line view of a vehicle frame rail 72 running along an outwardly facing side of the traction battery pack 18. The vehicle frame rail 72 is in FIG. 2 is a driver side vehicle frame rail. The vehicle 60 includes another passenger side frame rail on an opposite side of the traction battery pack 18.

Figure 3A:
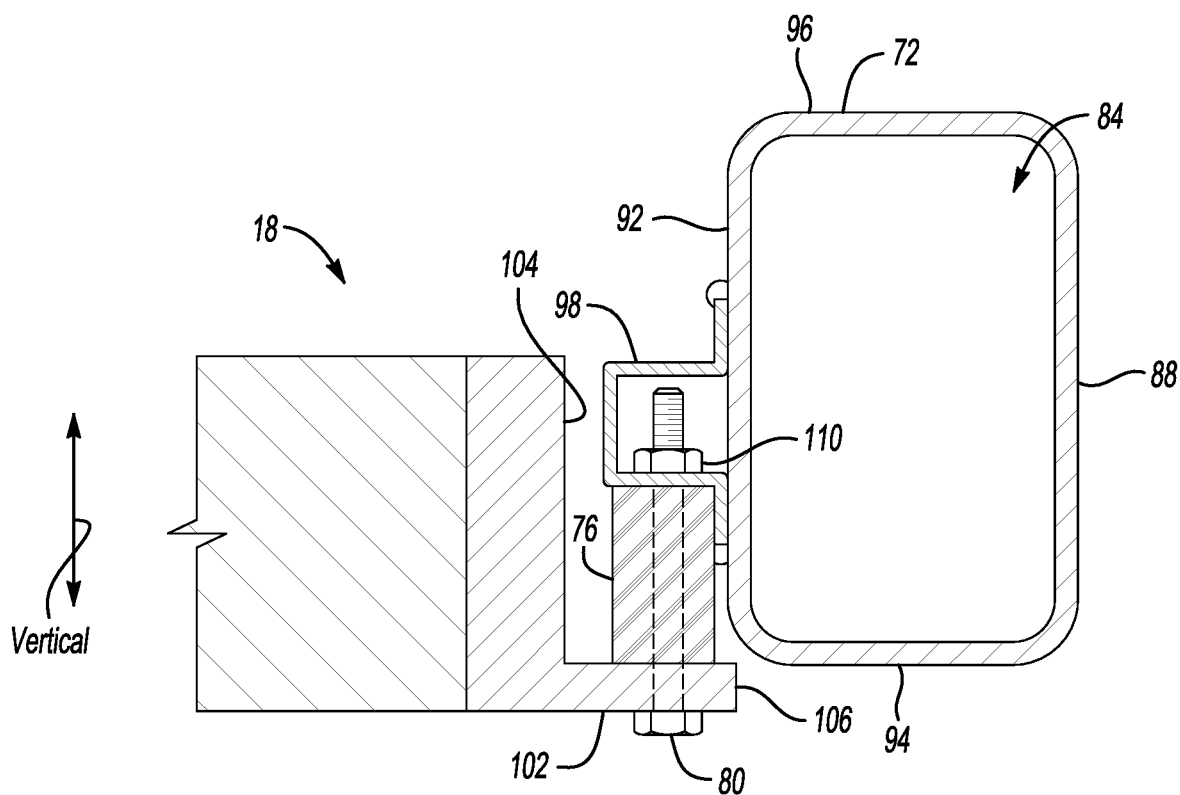
FIGS. 3A and 3B illustrate a traction battery pack support system according to an exemplary aspect of the present disclosure.
Figure 3B:
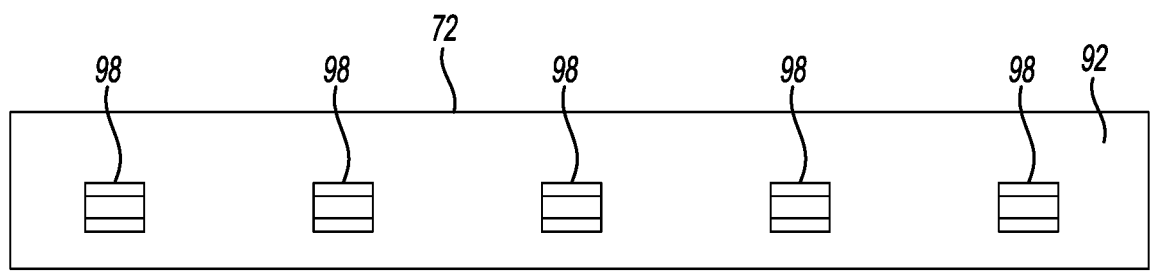

With reference now to FIGS. 3A and 3B, a traction battery pack support system according to an exemplary embodiment of the present disclosure, includes the frame rail 72, a vibration isolator 76, and at least one fastener 80 that couples the traction battery pack 18 to the vehicle frame rail 72 through the vibration isolator 76. The vibration isolator 76 is, notably, disposed outside an interior 84 of the vehicle frame rail 72. The vibration isolator 76 is also, notably, at least partially vertically aligned with the vehicle frame rail 72.

The vehicle frame rail 72 can be an extruded vehicle frame rail. The vehicle frame rail 72 can include a continuous cross-section as shown in FIG. 3A about an entire perimeter of the interior 84. The vehicle frame rail 72 is extruded in some examples.

The example vehicle frame rail 72 includes an outboard side 88, an inboard side 92, a bottom side 94, and a top side 96. A bracket 98 is welded to the inboard side 92 of the vehicle frame rail 72. The inboard side 92 faces inward toward a centerline of the vehicle 60. In other examples, the bracket 98 is secured to the vehicle frame rail 72 in other ways, such as by mechanical fasteners.

The battery pack 18 includes a mid-rail 102 having a flange 106 that extends laterally outward away from the portions of the traction battery pack 18. This flange 106 extends laterally outward from the traction battery pack 18 to a position where the flange 106 laterally overlaps with the bracket 98. The vibration isolator 76 is disposed vertically between a portion of the flange 106 and a portion of the bracket 98. The vibration isolator 76 is disposed laterally between a horizontally facing sidewall 104 of the traction battery pack 18 and the vehicle frame rail 72.

The fastener 80 extends through an aperture in the flange 106, through an aperture in the vibration isolator 76, and through an aperture in the bracket 98 to threadably engage a nut 110. The fastener threadably engages the nut 110 to connect the flange 106 to the bracket 98 thereby coupling the traction battery pack 18 to the vehicle frame rail 72.

The securing of the fastener 80 compresses the vibration isolator 76 between the bracket 98 and the flange 106. The vibration isolator 76 helps to isolate vibrations of the traction battery pack 18 relative to the vehicle frame rail 72, and vice versa. The vibration isolator 76 can be a cylindrical structure comprising rubber, for example.

The vibration isolator 76, in the exemplary embodiment, includes a portion that is vertically aligned with a portion of the vehicle frame rail 72. The vibration isolator 76 also includes a portion that is vertically aligned with the traction battery pack 18. The overall system for supporting the traction battery pack 18 shown in FIG. 3A has a vertical height that is less than a vertical height of other types of support systems, such as support systems where the traction battery pack 18 is supported vertically upon vibration isolators, which are positioned vertically beneath the traction battery pack 18. The vibration isolator 76, in this example, has a circular or oval axial cross-sectional profile. In another example, vibration isolators 76 could have other cross-sectional profiles, such as rectangular.

The nut 110 is a caged nut in the exemplary embodiment that is held within an interior of the bracket 98. The nut 110 could instead be a weld nut.

The driver side of the traction battery pack 18 can be secured at several distinct locations to the vehicle frame rail 72. In the exemplary embodiment shown in FIG. 3, there are five brackets 98 secured along the inboard side 92 of the vehicle frame rail 72. The traction battery pack 18 is thus secured at five separate and distinct locations to the vehicle frame rail 72 on a driver side. The passenger side of the traction battery pack 18 may be similarly secured to the passenger side rail.

Figure 4A:
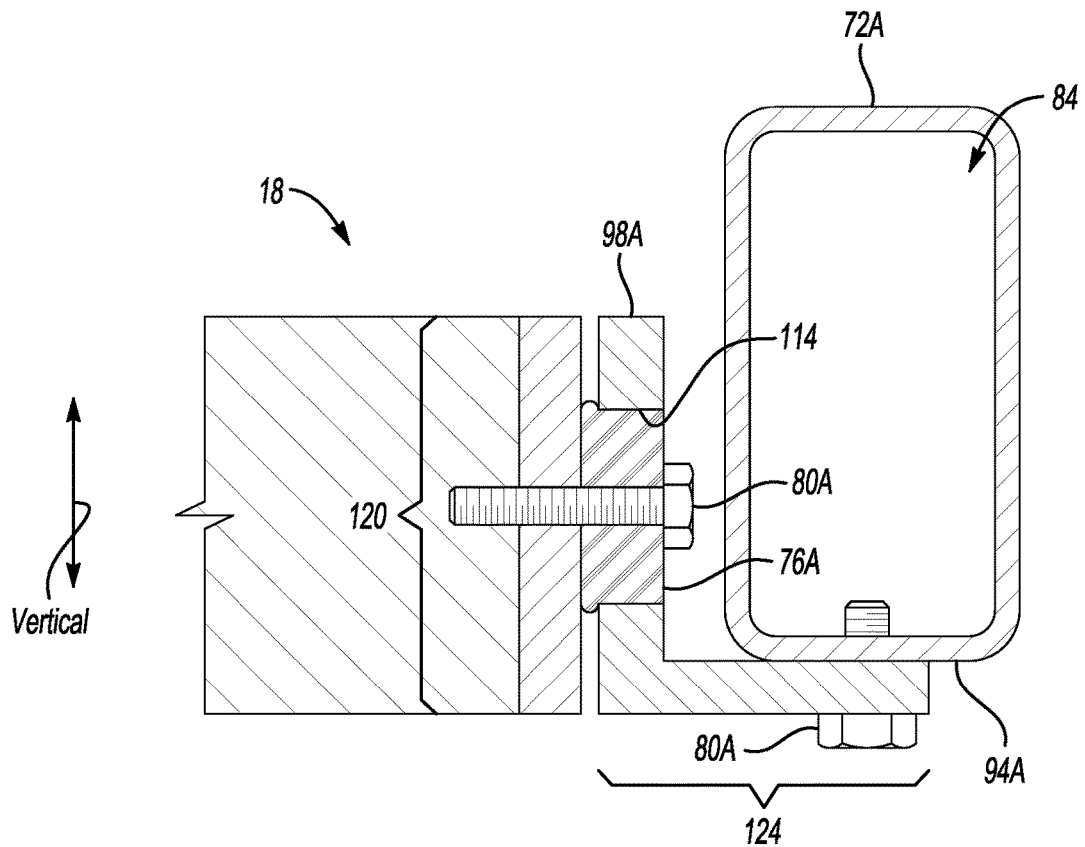
FIGS. 4A and 4B illustrate a traction battery pack support system according to another exemplary aspect of the present disclosure.
Figure 4B:
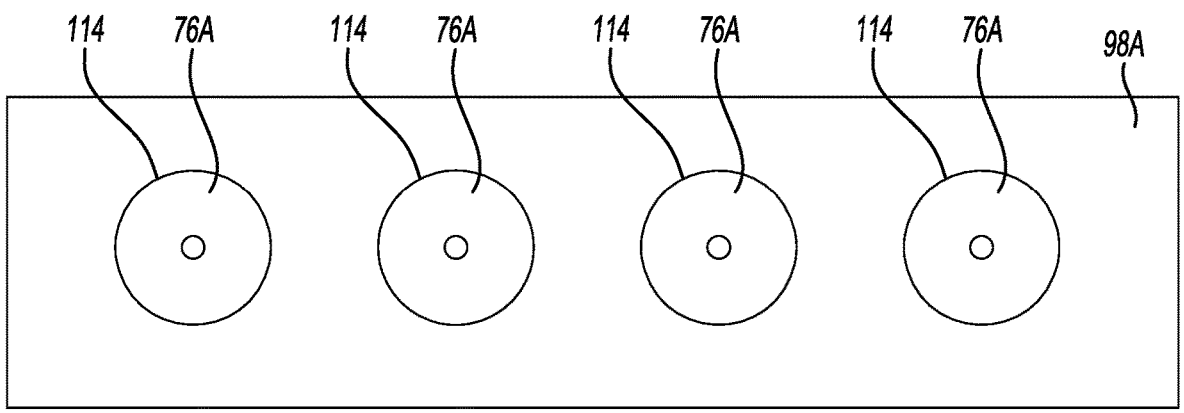

With reference now to FIGS. 4A and 4B, the support system according to another exemplary aspect of the present disclosure includes a bracket 98A having an aperture 114 that receives a vibration isolator 76A. A mechanical fastener 80A connects the bracket 98A to the traction battery pack 18, and particularly a horizontally facing side of the traction battery pack 18, through the vibration isolator 76A. A second mechanical fastener 80A' connects the bracket 98A directly to a vehicle frame rail 72A.

In the exemplary embodiment, the bracket 98A includes a vertically extending portion 120 and a horizontally extending portion 124. The vertically extending portion 120 includes the aperture 114 that holds the vibration isolator 76A. The horizontally extending portion 124 includes a portion that extends vertically beneath the vehicle frame rail 72A. The second mechanical fastener 80A' extends through the aperture in the horizontally extending portion 124 of the bracket 98A when connecting the bracket 98A directly to the vehicle frame rail 72A. The second mechanical fastener 80A' extends through the aperture in the horizontally extending portion 124 of the bracket 98A along with an aperture in a bottom side 94A of the vehicle frame rail 72A. The vibration isolator 76A is again disposed outside an interior 84A of the vehicle frame rail 72A. The vibration isolator 76A is also at least partially vertically aligned with the vehicle frame rail 72A. In the exemplary embodiment, the bracket 98A includes apertures 114 along its longitudinal length. Each of the apertures 114 receives a respective vibration isolator 76A.

Figure 5:
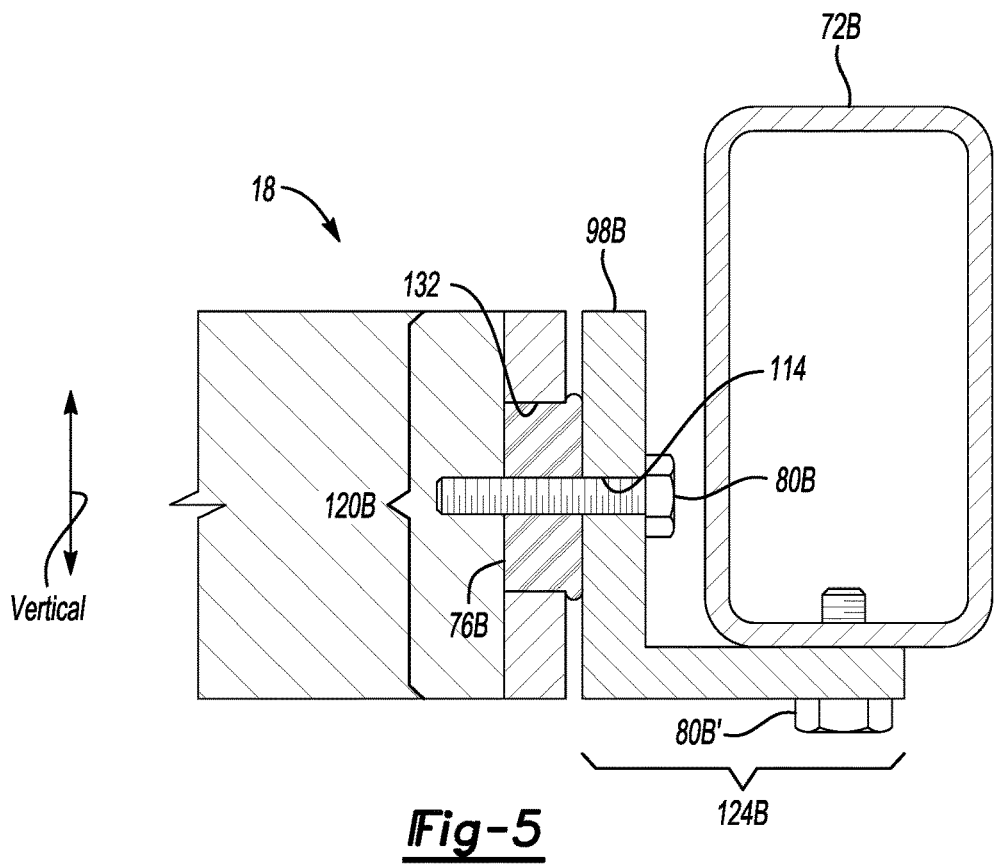
FIG. 5 illustrates a section view of a traction battery pack support system according to yet another exemplary aspect of the present disclosure.

With reference now to FIG. 5, a traction battery pack support system, according to yet another exemplary aspect of the present disclosure, includes a bracket 98B. Fastener 80B extends through an aperture 114B in the bracket to connect the bracket 98B to the traction battery pack 18 through a vibration isolator 76B. A second fastener 80B' directly connects the bracket 98B to the vehicle frame rail 72B. The vibration isolator 76B is held within an aperture 132 within the traction battery pack 18. The bracket 98B includes a vertically extending portion 120B and a horizontally extending portion 124B. The fastener 80B extends through the aperture 114, which is in the vertically extending portion 120B. The fastener 80B' extends through an aperture in the horizontally extending portion 124B. The horizontally extending portion 124B extends vertically beneath a portion of the vehicle frame rail 72B.

Figure 6:
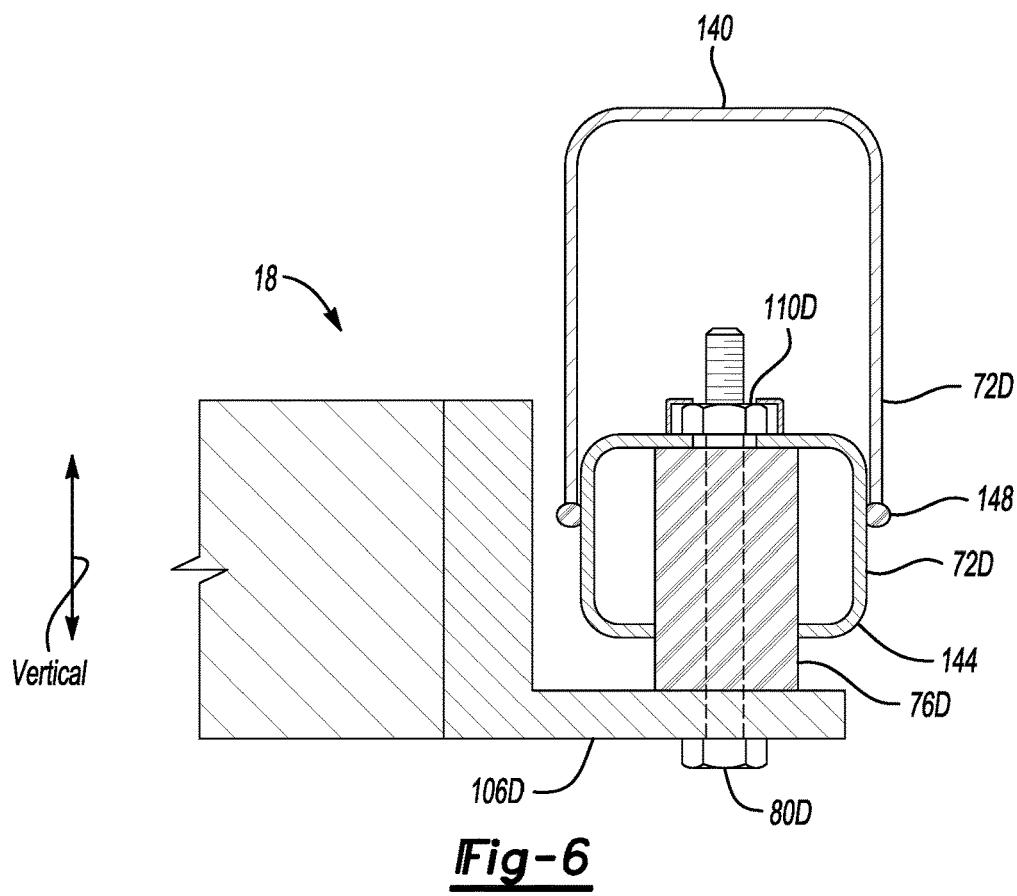
FIG. 6 illustrates traction battery pack support system according to yet another exemplary aspect of the present disclosure.

With reference now to FIG. 6, a support system, according to yet another exemplary aspect of the present disclosure, includes a frame rail assembly 72D having a first frame rail portion 140 and a second frame rail portion 144. The second frame rail portion 144 is secured directly to the first frame rail portion 140 using welds 148, for example. The second frame rail portion 144 is, in the exemplary embodiment, received at least partially within the first frame rail portion 140.

The traction battery pack 18 includes a flange 106D that extends laterally outward to a position where the flange 106D is vertically beneath the frame rail assembly 72C. A fastener 80D extends through an aperture in the flange 106D, through an aperture in a vibration isolator 76D, and through an interior of the second frame rail portion 144 to engage a nut 110D. Securing the fastener 80D to the nut 110D compresses the vibration isolator 76D between the flange 106D and the vehicle frame rail assembly 72C. The fastener 80D couples the traction battery pack 18 to the first frame rail portion 140 through the vibration isolator 76D and the second frame rail portion 144.

The first frame rail portion 140 can be considered an upper frame rail portion, whereas the second frame rail portion 144 can be considered a lower frame rail portion.

The two frame rail portions facilitate the incorporation of the nut 110D and a reduced overall vertical packaging height.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery pack support system, comprising:
a vehicle frame rail of an electrified vehicle;
a traction battery pack;
a vibration isolator that is disposed outside an interior of the vehicle frame rail and is at least partially vertically aligned with the vehicle frame rail;
at least one fastener that couples the traction battery pack to the vehicle frame rail through the vibration isolator;
a bracket secured to the vehicle frame rail, wherein the bracket is one of a plurality of brackets that are separate and distinct from one another, each bracket within the plurality of brackets secured to an inboard side of the vehicle frame rail; and
a flange of the traction battery pack, the flange extending laterally outward from the traction battery pack to laterally overlap with the bracket, wherein the vibration isolator is disposed vertically between a portion of the flange and a portion of the bracket, wherein the at least one fastener connects the flange to the bracket to couple the traction battery pack to the vehicle frame rail.

2. The traction battery pack support system of claim 1, wherein the at least one fastener extends through an aperture in the isolator.

3. The traction battery pack support system of claim 1, wherein the isolator is compressed vertically between the flange and the bracket when the at least one fastener is connecting the flange to the bracket.

4. The traction battery pack support system of claim 1, wherein the at least one fastener is a threaded fastener that extends through an aperture in the flange and an aperture in the bracket.

5. The traction battery pack support system of claim 1, wherein at least a portion of the isolator is vertically aligned with the vehicle frame rail and the traction battery pack.

6. The traction battery pack support system of claim 1, wherein the flange extends vertically beneath the isolator and vertically beneath the bracket.

7. The traction battery pack support system of claim 1, further comprising a nut within an interior of the bracket, the at least one fastener is threadably engaged with the nut to couple the traction battery pack to the vehicle frame rail.

8. The traction battery pack support system of claim 1, wherein the vibration isolator is disposed laterally between a horizontally facing sidewall of the traction battery pack and the vehicle frame rail.

9. The traction battery pack support system of claim 1, wherein the bracket is welded to an inboard side of the vehicle frame rail, the inboard side facing inward toward a centerline of the electrified vehicle.

10. The traction battery pack support system of claim 1, wherein the at least one fastener is a plurality of fasteners, the flange connected to each of the plurality of brackets through a respective fastener within the plurality of fasteners.

11. The traction battery pack support system of claim 7, wherein the nut is received entirely within the interior of the bracket.

12. The traction battery pack support system of claim 11, where the nut is a cage nut.

13. The traction battery pack support system of claim 11, where the nut is a weld nut.

14. A traction battery pack support system, comprising:
a vehicle frame rail of an electrified vehicle;
a traction battery pack;
a plurality of connection assemblies, each connection assembly including a vibration isolator, a bracket, and a threaded fastener,
the plurality of vibration isolators each disposed outside an interior of the vehicle frame rail and at least partially vertically aligned with the vehicle frame rail,
the plurality of brackets each secured to the vehicle frame rail, each bracket within the plurality of brackets separate and distinct and distinct from each other, and spaced a distance from each other,
the plurality of threaded fasteners each coupling the traction battery pack to the vehicle frame rail through a respective vibration isolator within the plurality of vibration isolators, the plurality of threaded fasteners each extending through an aperture in the respective vibration isolator; and
a flange of the traction battery pack, the flange extending laterally outward from the traction battery pack to laterally overlap with the plurality of brackets, wherein the plurality of vibration isolators are disposed vertically between a portion of the flange and a portion of the plurality of brackets, wherein the plurality of fasteners connect the flange to the plurality of brackets to couple the traction battery pack to the vehicle frame rail.

15. The traction battery pack support system of claim 14, further comprising a plurality of threaded nuts, each fastener within the plurality of fasteners threadably engaged with a respective nut within the plurality of threaded nuts to couple the traction battery pack to the vehicle frame rail, the threaded nuts each disposed entirely within an interior of one of the brackets.

16. The traction battery pack support system of claim 15, wherein the flange extends vertically beneath the plurality of vibration isolators and vertically beneath the plurality of brackets,
wherein the plurality of vibration isolators are disposed laterally between a horizontally facing sidewall of the traction battery pack and the vehicle frame rail.

* * * * *